(12) United States Patent
Lanzki et al.

(10) Patent No.: US 8,276,737 B2
(45) Date of Patent: Oct. 2, 2012

(54) DEVICE FOR THE TRANSPORT OF PASSENGERS

(75) Inventors: Winfried Lanzki, Unna (DE); Andreas Tautz, Waltrop (DE); Carsten Rolf, Sprockhövel (DE); Alfred Thiel, Lauda-Königshofen (DE); Heinrich Zeiger, Münster (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/317,024

(22) Filed: Oct. 7, 2011

(65) Prior Publication Data

US 2012/0031729 A1 Feb. 9, 2012

Related U.S. Application Data

(63) Continuation of application No. PCT/DE2010/000392, filed on Apr. 6, 2010.

(30) Foreign Application Priority Data

Apr. 9, 2009 (DE) .......................... 10 2009 017 076

(51) Int. Cl.
*B66B 21/02* (2006.01)

(52) U.S. Cl. ...................................... 198/326; 198/321

(58) Field of Classification Search ........... 198/321–338
See application file for complete search history.

(56) References Cited

U.S. PATENT DOCUMENTS

| | | | | |
|---|---|---|---|---|
| 4,746,000 A * | 5/1988 | Nakatani et al. | ............. | 198/328 |
| 4,775,044 A * | 10/1988 | Hofling | .......................... | 198/330 |
| 4,809,840 A * | 3/1989 | Nakatani | ....................... | 198/328 |
| 5,052,539 A | 10/1991 | Fillingsness et al. | | |
| 7,137,500 B2 * | 11/2006 | Fargo | ............................. | 198/330 |
| 7,574,271 B2 * | 8/2009 | Steindl et al. | .................... | 700/21 |
| 2002/0153224 A1 * | 10/2002 | Pietz | ............................. | 198/321 |
| 2002/0162726 A1 * | 11/2002 | Henkel et al. | ................. | 198/330 |
| 2003/0000801 A1 * | 1/2003 | Spannhake et al. | ........... | 198/322 |
| 2006/0144672 A1 * | 7/2006 | Thaler et al. | .................. | 198/326 |
| 2008/0067034 A1 * | 3/2008 | Illedits et al. | ................. | 198/330 |
| 2009/0120762 A1 * | 5/2009 | Gonzalez Alemany et al. | ............................. | 198/330 |

FOREIGN PATENT DOCUMENTS

| | | |
|---|---|---|
| DE | 2314120 A1 | 9/1974 |
| DE | 202004020583 U1 | 9/2005 |
| JP | 4371485 A | 12/1992 |

* cited by examiner

*Primary Examiner* — Mark A Deuble
(74) *Attorney, Agent, or Firm* — Harness, Dickey & Pierce, P.L.C.

(57) ABSTRACT

Device for the passenger transport, in particular an escalator provided with steps or a moving walkway equipped with pallets, wherein the steps or pallets are connected to each other to form a continuous step or pallet belt and can be moved in the direction of transport by means of drive elements, wherein a lower entrance or exit section of the device is connected to an upper exit or entrance section via at least one arched transport section which, seen over the length and height thereof, is formed by different radii which verge into each other, wherein at least the arched transport section is composed of several linear framing sections which are connected to each other in the region of the facing ends thereof.

19 Claims, 8 Drawing Sheets

DEVICE FOR THE TRANSPORT OF PASSENGERS

CROSS-REFERENCE TO RELATED APPLICATIONS

This is a Continuation of PCT/DE2010/000392 filed on Apr. 6, 2010 which is an International Application claiming priority from DE 10 2009 017 076.6 filed on Apr. 9, 2009, the entire contents of which are hereby incorporated by reference.

The invention relates to a device for the transport of passengers, in particular an escalator provided with steps or a moving walkway equipped with pallets, wherein the steps or pallets are connected to each other to form a continuous step or pallet belt and can be moved in the direction of transport by means of drive elements.

DE 23 14 120 discloses an escalator having an endless step belt, the steps of which respectively comprising two opposite step or abutting surfaces are guided in the carrying end of the belt with quasi horizontal treads over running paths which extend in opposite directions or over inclined distances which are interconnected by a moving walkway section, wherein the running paths of the step belt are divided into path sections which are respectively allocated to one of the inclined distances as well as eventually to the moving walkway distance, wherein the path sections are arranged in a continuously connected manner at inclined distance framings as well as eventually moving walkway distance framings which are detachably connected to each other in the areas of the section ends.

DE 20 2004 020 583 U1 discloses a modernized escalator or a modernized moving walkway comprising a cored support framing into which templates can be inserted and aligned in the reversing areas and, in case of need, also in the transition areas, which templates comprise support elements as orientation spots for components to be newly installed at pre-determinable places.

JP 04371485 A describes a handrail guiding device of a passenger transport unit.

Transport sections which extend in an inclined manner with a pre-determinable angle and which are connected to each other via a horizontal transport section extend between a lower entrance or exit area and an upper exit or entrance area.

U.S. Pat. No. 5,052,539 describes a so called curved escalator, in which two spatial curve sections are provided and the steps are guided from the one curve section into the other one. Due to this start position, the steps have to be particularly adapted to the contour of the curve. The same is true for the step guiding.

It is the object of the invention to provide an alternative transport section for a passenger transport system which connects a lower entrance or exit area to an upper exit or entrance area in such a way that apart from optical and esthetic impressions a technical concept is provided which presents a simple structure such that even in case of damages in the course of the transport path the respectively damaged structural element can be replaced in a simple manner.

It is furthermore the object of the invention to provide a bearing for escalators or moving walkways which are guided in the manner of a spatial curve arc, which bearing assures a defined orientation and placement of the individual framing sections independent from the angle of inclination or the course of curvature of the curve arc.

Furthermore, a modern drive concept for passenger transport installations which are guided in the manner of a spatial curve arc shall be proposed, wherein long transport distances can be covered with low energy requirement using smaller drive units.

The first aim is achieved according to the invention in that a lower entrance or exit section of the device is connected to an upper exit or entrance section via at least one arched transport section which, seen over the length and height thereof, is formed by different radii which verge into each other, wherein at least the arched transport section is composed of several linear framing sections which are connected to each other in the region of the facing ends thereof.

Advantageous embodiments of the device according to the invention are disclosed in the sub-claims.

The second aim is achieved by a bearing for a framing section of a device for the passenger transport which is guided in the manner of a spatial curve arc, in particular an escalator or a moving walkway, formed by several interconnected consoles which can be adjusted with respect to each other and which are actively related to setting means.

Advantageous embodiments of the bearing according to the invention are disclosed in the associated sub-claims.

The third aim is achieved by a drive system for a device of the passenger transport, in particular an escalator or moving walkway which is guided in the manner of a spatial curve arc, comprising at least two electric motors which are designed for approximately the same capacity and, in case of need, provided with gears, which electric motors are positioned along the transport path of the device between the transport means formed by chains and are controlled by frequency converters.

Advantageous embodiments of this drive system are disclosed in the associated sub-claims.

The respective curve arc which forms the transport section can, seen over the length thereof, comprise a constant curvature, for example a radius of pre-determinable length.

Alternatively, it is possible that the respective curve arc which forms the transport section is, seen over the length thereof, formed by different radii which verge into each other. Herein, geometric contours, such as hyperbolas, parabolas or the like are convenient.

It is also imaginable that the transport section comprises several curve arcs having the same or different curvatures, which can present an opposed shape, in case of need. Thus, convex and concave constructions can be achieved.

It is also imaginable that several curve arcs having different curvatures will be actively related to linear sections in the course of the transport section.

In particular in view of the replacement of damaged pieces it is particularly advantageous that the respective arched transport section is formed by several linear framing sections which are connected to each other in the region of the facing ends thereof.

Depending on the distance to be covered between the entrance/exit section or the exit/entrance section, respectively the height to be covered it is possible to design the arched or step-like transport section as a cantilever type.

If this causes static problems for reasons of distance and height, it is also possible to arrange the framing sections in a supporting manner on an arched substructure provided on the side of the building.

As already mentioned, the individual framing sections have a linear shape, i.e. they do not follow the arched shape of the substructure. In order to assure an assembly without problems, it is proposed to provide at least one bearing in the region of each framing section, by means of which the respective framing section can be positioned in an adjustable manner with respect to the substructure.

Herein, a concrete technical embodiment provides to install two consoles which face each other and can be adjusted with respect to each other and which are actively related to setting means on the side of the framing section and on the side of the building.

According to another aspect of the invention, a transverse bar for receiving several bearings will be positioned in the region of each framing section, which transverse bar is provided with rounded outer edges at least on the side of the consoles, wherein at least the adjustable console will be provided with a rounded section which can be guided over rounded edges of the transverse bar.

The respective setting means is advantageously formed by a setting screw which can be adjusted within an insert nut positioned in the transverse bar.

As temperature dependent changes of length of the framing sections in the arched or step-like transport section in dependence on the distance to be covered between the entrance and exit sections cannot be excluded, it is proposed according to another aspect of the invention to provide the setting screw with a sliding body in the end region thereof which faces the substructure on the side of the building, which sliding body rests on a sliding surface which is, in case of need, metallic and provided at the substructure on the side of the building.

Advantageously, oblong holes are provided in at least one of the consoles, into which oblong holes guiding elements of the other console can be inserted and be fixed after corresponding adjustment and orientation of the respective framing section.

Each electric motor which, in case of need, cooperates with a reducing gear is designed with respect to the capacity for a transport section of pre-determinable length. Depending on the transport length of the passenger transport installation, any number of electric motors can be built in between the transport means formed as plate link chains. Each electric motor cooperates with a frequency converter, wherein defined measuring signals of the respective frequency converter will be transmitted to a central control system.

It is particularly advantageous that electric motors which are, in case of need, provided with gears are built in between the transport means. This reduces the overall length of the passenger transport installation. One of the electric motors is provided with reversing elements formed as chain starwheels which reverse the transport means in one of the end regions of the passenger transport installation. In case of need, another drive having reversing elements can be provided in the other end region, but only chain starwheels can be provided as reversing elements. The at least one other electric motor which is positioned in the region of the transport path between the transport means cooperates with chain wheels, the teeth of which are adjacent to the bolts of the plate link chains and exclusively provide for the linear movement of the transport means.

The control system is a closed, speed controlled drive system with a higher ranking control unit. The higher ranking control unit receives the information from the drives via the associated frequency converters. For this purpose, a pulse generator is mounted on each drive.

Since a closed, speed controlled system is provided here, the orientation of the individual drives with respect to each other has to be determined at first such that the drive wheels (chain starwheels/chain wheels) of all drives are always connected in a form-fit manner to the chain.

The position of the drives with respect to each other will be determined by a reference run. For this purpose, the upper drive blocks the chain during the downward movement or the lower drive blocks the chain during the upward movement. The other drives are moved with a predetermined turning moment until the chain wheel stops in the chain. The thus determined position will be memorized in the higher ranking control unit, wherein a manually determined correction value will be considered for the upper (lower) drive. This is necessary since the chain wheels of the upper (lower) drive are situated at the wrong stop of the chain due to the blocking of the chain.

For the further operation the memorized orientation of the drives with respect to each other will be used as reference. The higher ranking control unit regulates the system such that the speed divergence of the drives with respect to each other is kept at the lowest possible value.

The subject of invention is represented in the drawing by means of an exemplary embodiment and described as follows. Herein FIG. 1 shows a schematic diagram of the device for the passenger transport according to the invention;

Figure 1:
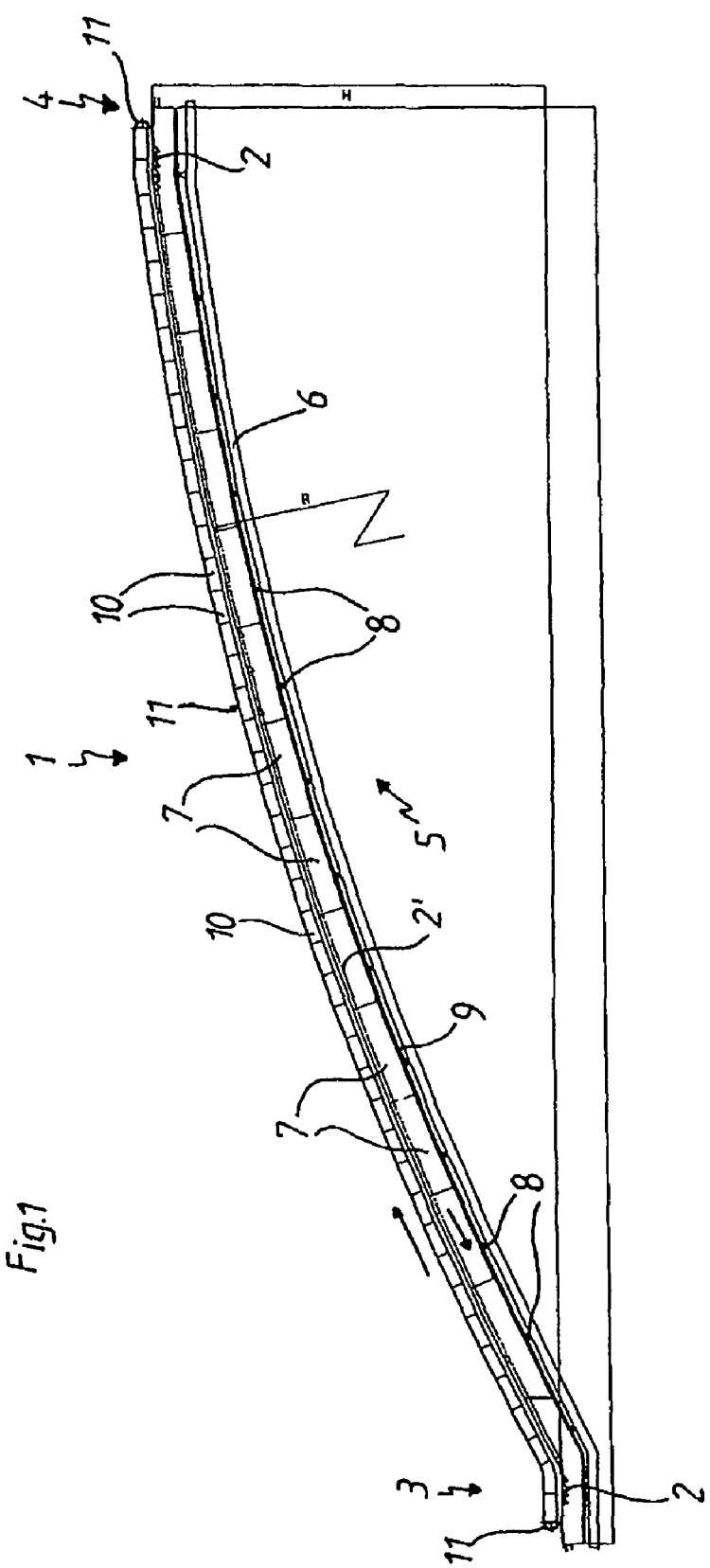

FIG. 1 is a schematic diagram which shows a device for the passenger transport 1 which is an escalator in this example. The same one can, in case of need, also be a moving walkway as far as the legally prescribed angles of inclinations have been observed. A step belt 2' composed of a plurality of steps 2 is only indicated. The different transport directions (upwards, downwards) are indicated by arrows. A not represented drive for the step belt 2' can be positioned in the region of the entrance 3 and/or exit section 4. In this example, the left lower part of FIG. 1 shall represent an entrance section 3 and the right upper part of FIG. 1 shall represent an exit section 4. A transport section 5 which is formed as spatial curve arc extends between the lower entrance section 3 and the upper exit section 4. In this example, a curve arc shall be given which comprises a pre-determinable radius R, for example 210 m. An arched substructure 6 which receives the transport section 5 is provided on the side of the building in this example. As already mentioned, the transport section can also be designed as cantilever type under certain conditions. The transport section 5 itself is formed by a plurality of linear framing sections 7. Each framing section 7 has bearings 8 by means of which it can rest on the surface 9 of the substructure 6. This will be in particular explained in further details in FIGS. 3 and 4.

Balustrade elements 10, for example in the form of glass panes, are mounted on the respective framing section, on which balustrade elements a handrail 11 is moved in the direction of transport. The moving direction of the handrail 11 will be reversed, in analogy to the step belt 2', in the entrance section 3 or the exit section 4. The handrail 11 can be eventually driven by the step belt drive or it cooperates with an own drive means. The difference in altitude H between the entrance section 3 and the exit section 4 shall be about 21.4 m in this example, whereas the overall length L of the escalator 1 is about 79 m.

Figure 2:
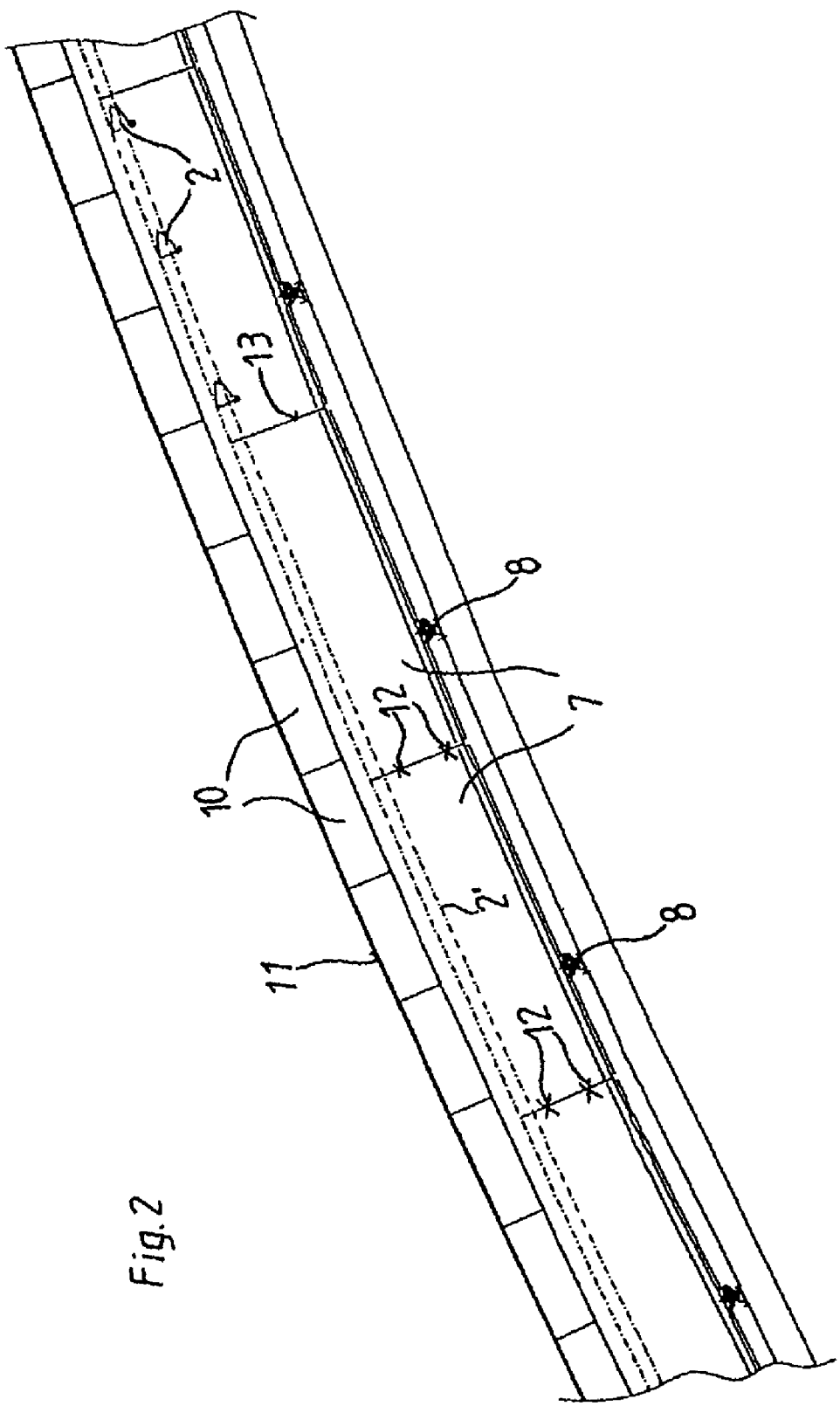
FIG. 2 shows a partial view of some of the framing sections including the support portions.

FIG. 2 is an enlarged representation of some of the framing sections 7 represented in FIG. 1 in connection with the bearings 8. The step belt 2' as well as individual steps 2 are also visible. One can also see balustrade elements 10 as well as the handrail 11. It is only indicated that the individual framing sections 7 will be actively related to each other via corresponding connecting elements 12.

Figure 3:
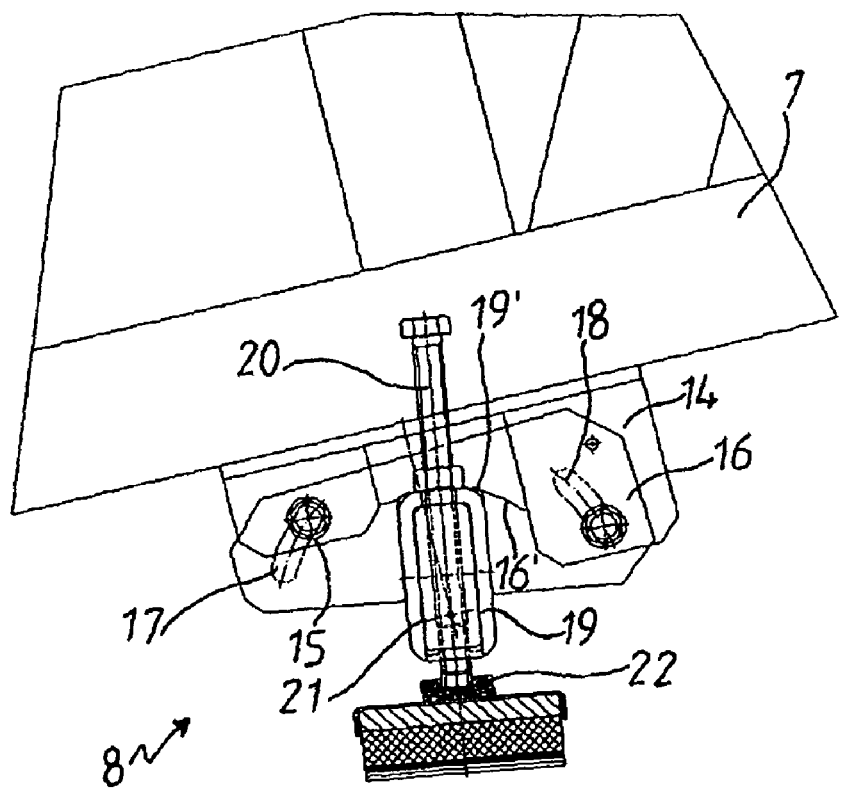
FIGS. 3 and 4 are representations of individual framing sections which have to be supported in different angles of inclination.
Figure 4:
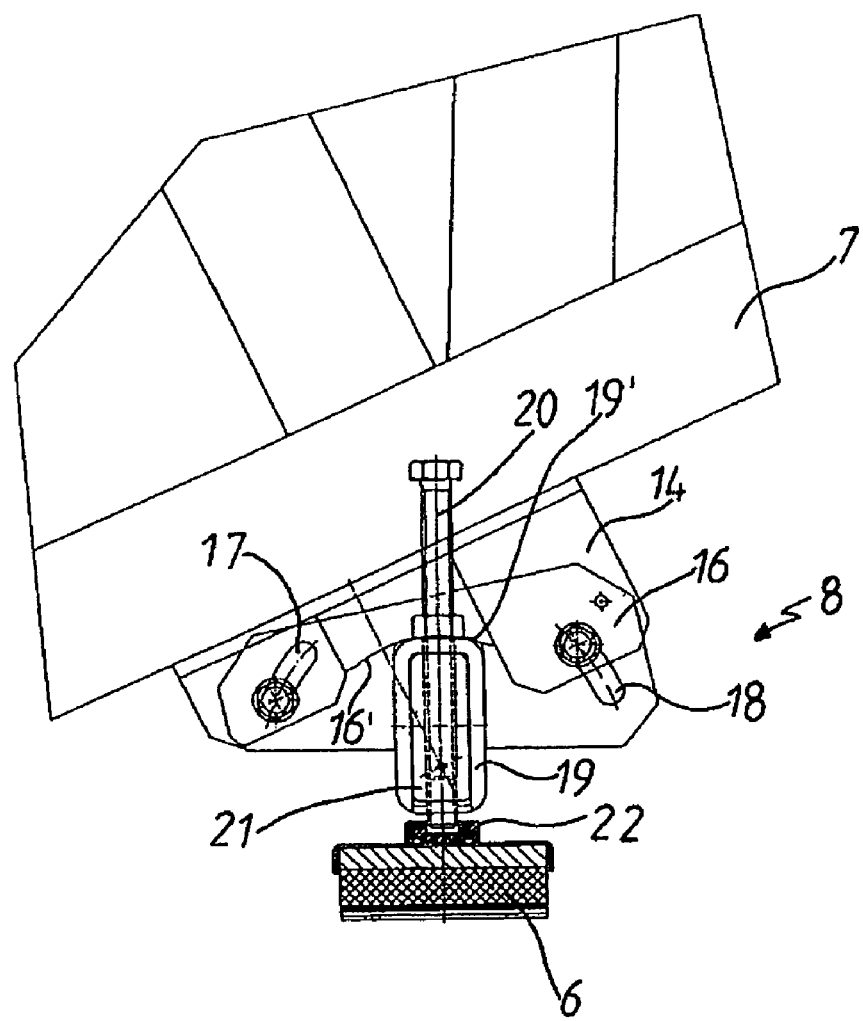

FIGS. 3 and 4 show two bearings 8 of the same kind in differently oriented positions. One can see parts of a framing section 7 which is constructed as a kind of framework. A first console 14 is fixed beneath the respective framing section 7, which console comprises a cylindrical guiding element 15 which points into the direction of a second console 16 and can be guided through an oblong hole 17, 18 arranged there. The respective oblong hole 17, 18 is provided on an arc of a circle with pre-determinable radius in the region of the respective console 14 or 16. Alternatively, it is possible to provide the console 14 with a through hole and to use a screw (not represented) as guiding element 15. A transverse bar 19 is indicated which is edgewise guided through beneath the respective framing section 7 and connected to the same one. The transverse bar 19 is provided with rounded outer edges 19' at least in the region on the framing side. At least one of the consoles 16 comprises a rounded section 16' in the region of the outer edges 19', which can be guided over the outer edges 19'. The bearing points 8 are positioned at pre-determinable spots in the region of the transverse bar 19. In the region of a setting element 20 formed as setting screw the transverse bar 19 receives an insert nut 21, wherein the setting screw 20 cooperates with a sliding body 22 in the region of the free end thereof. The substructure 6 on which rests the sliding body 22 is only indicated.

Figure 5:
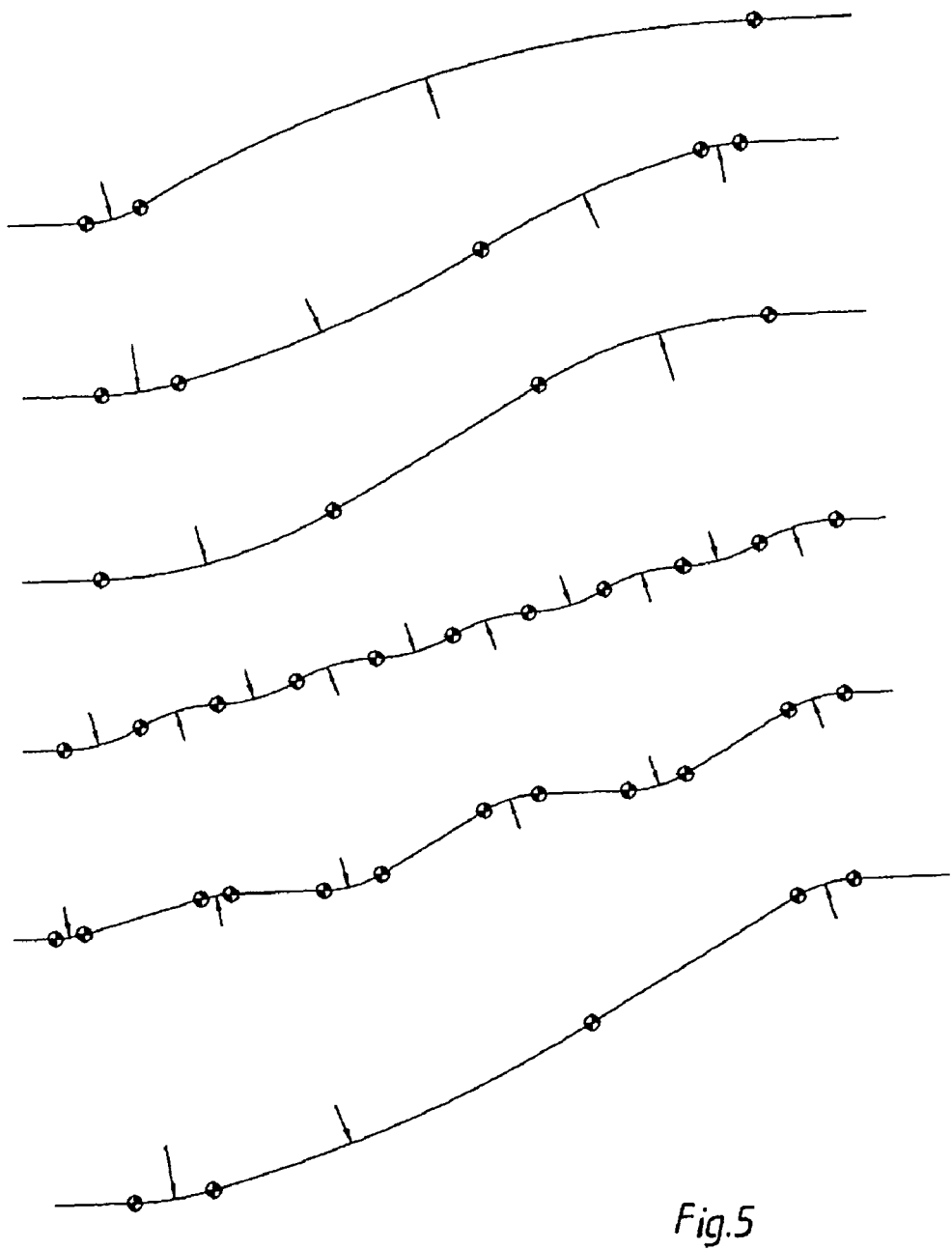
FIG. 5 shows line-like guiding forms of transport sections of an escalator.

FIG. 5 shows lines which illustrate some technically realizable options to connect entrance or exit sections of an escalator and transport sections to each other. Different convex and concave curve sections are used. The different radii are represented by arrows. As already explained, the radii can have different dimensions. In case of need, curve-like transport sections can be combined with linear transport sections.

Figure 6:
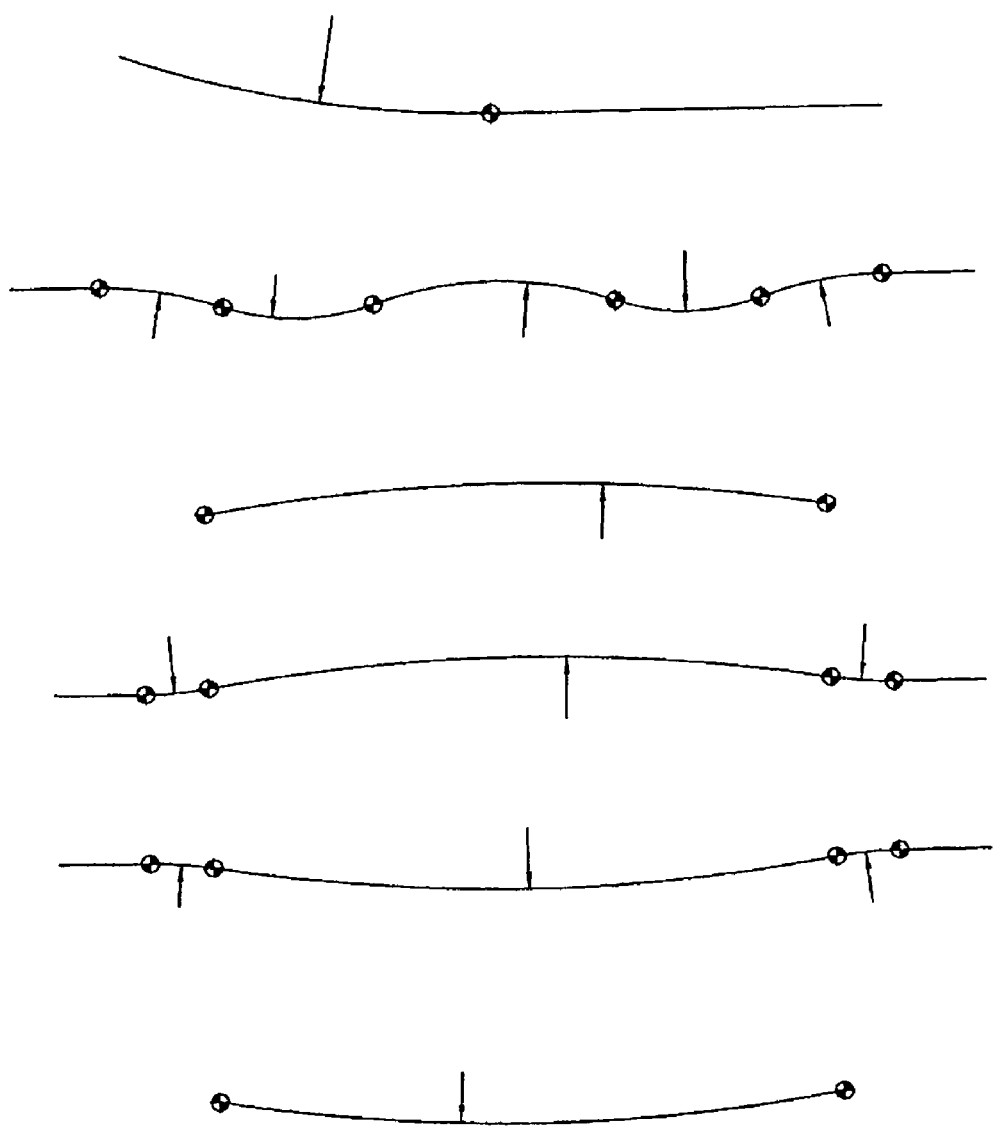
FIG. 6 shows line-like guiding forms of transport sections of a moving walkway.

FIG. 6 shows lines which illustrate some technically realizable options to connect entrance or exit sections of a moving walkway and transport sections to each other. For moving walkways it has to be taken care that the legally prescribed angles of inclination are observed.

Figure 7:
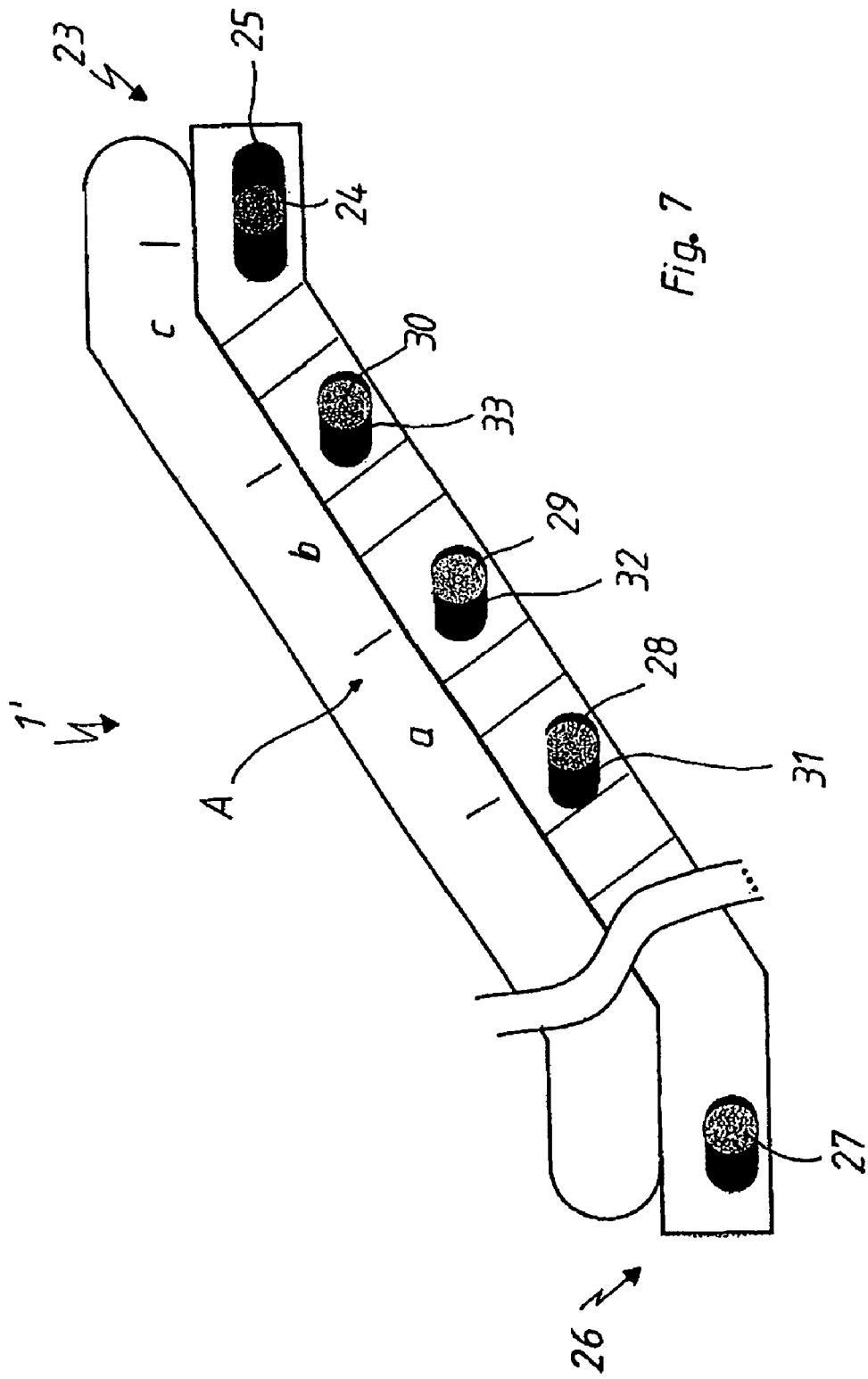
FIG. 7 shows a partial representation of the drive system according to the invention.

FIG. 7 is a schematic diagram which shows a common device for the passenger transport 1', formed by an escalator in this example. All components which are represented here can also be transferred to a passenger transport device 1 according to FIG. 1. In the example according to FIG. 1, a first electric motor 24 including an indicated reducing gear 25 is positioned in the upper reversing area 23 of the device 1'.

In this example, an additional handrail drive 27 is provided in the lower area 26 of the device 1'.

The device 1 can be used for covering any transport altitudes and/or transport distances, in that at least one other electric motor 28, 29, 30 including reducing gears 31, 32, 33 will be positioned in the region of the transport distance A between the here no further represented plate link chains which form transport means. This arrangement offers a construction which is extremely space saving. It is not represented here that the electric motor 24 respectively the reducing gear 25 provided in the region 23 cooperates with two reversing elements which are formed by chain starwheels which reverse the moving direction of the plate link chains in the region 23. All electric motors are approximately designed in the same way with respect to the capacity, wherein each electric motor 24, 28, 29, 30 serves for the movement of the transport means over a defined section a, b, c of the transport distance A.

The electric motors 28 through 30 respectively the reducing gears 31 through 33 cooperate with neither represented chain wheels which are in engagement with the plate link chains and exclusively take care of the linear movement of the transport means.

Figure 8:
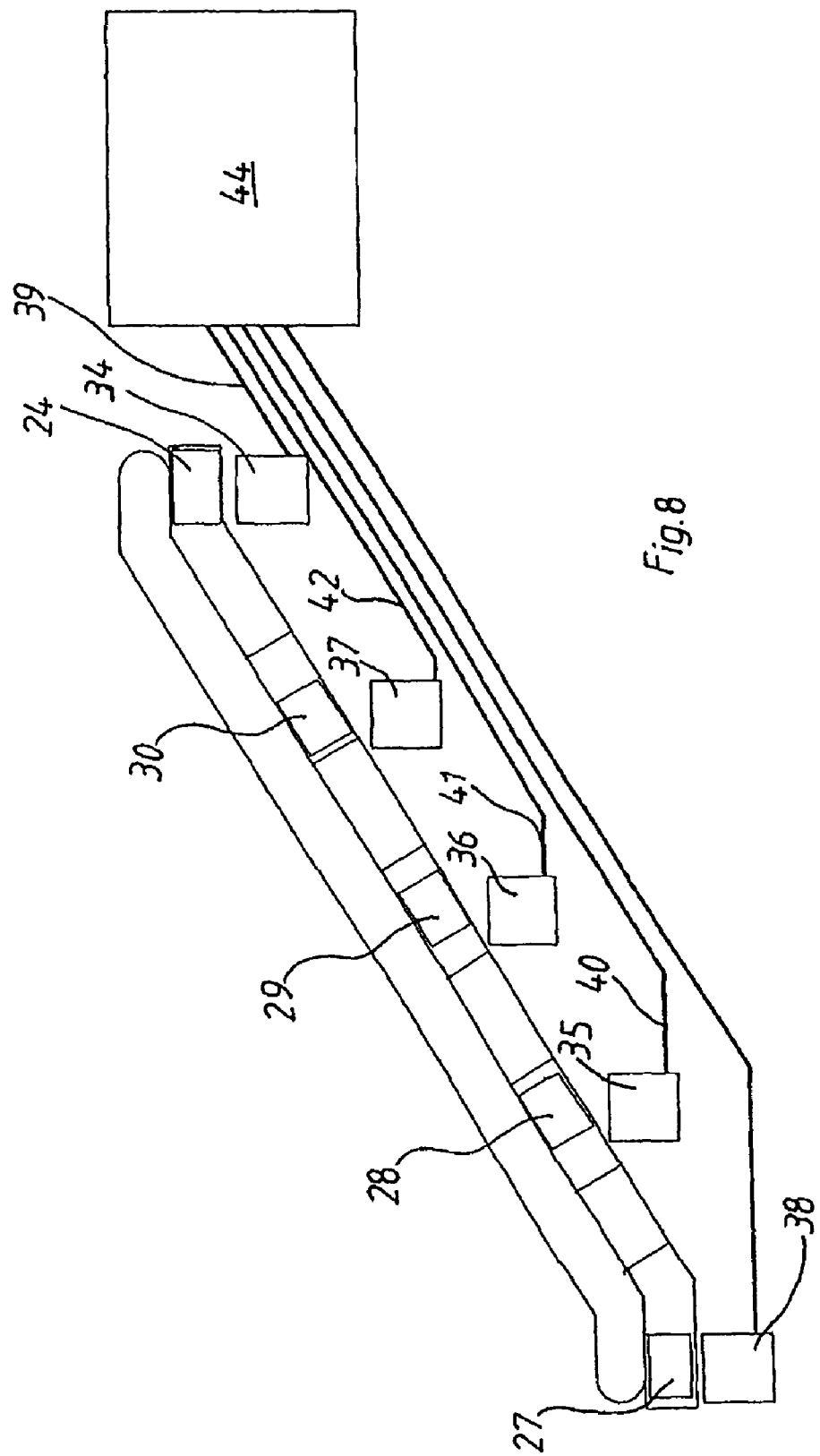
FIG. 8 shows a schematic diagram of a control diagram for the drive system according to FIG. 7.

FIG. 8 is a schematic diagram which shows a control scheme of the drive system represented in FIG. 7. Each electric motor 24, 28, 29, 30 cooperates with a frequency converter 34, 35, 36, 37. The handrail drive 27 is also equipped with a frequency converter 38. The frequency converters 34 through 38 are actively related to a higher ranking control unit 44 via corresponding data lines 39, 40, 41, 42, 43.

The control system composed of the higher ranking control unit 44 as well as the frequency converters 34 through 37 is a closed, speed controlled drive system. The higher ranking control unit 44 receives the information from the drives 24, 28 through 30 via the associated frequency converters 34 through 37. For this purpose a no further represented pulse generator is mounted on each drive 24, 28 through 30. For determining a reference pattern by means of which the position of the drives 24, 28 through 30 with respect to each other will be determined, the device 1' is first of all started. Herein, the drive 24 blocks the no further represented chains during the downward movement. The other drives 28 through 30 are moved with a predetermined turning moment until the associated chain wheels stop in the chain. The thus determined position will be memorized as reference pattern in the higher ranking control unit 44. For the further operation, the memorized orientation of the drives 24, 28 through 30 with respect to each other will then be used as reference. The higher ranking control unit 44 controls the drive system such that the speed divergences of the drives 24, 28 through 30 with respect to each other will be kept at the lowest possible value.

LIST OF REFERENCE NUMERALS 1 device for the passenger transport
2 steps
2' step belt
3 entrance section
4 exit section
5 transport section
6 substructure
7 framing section
8 bearing
9 surface
10 balustrade element
11 handrail
12 connecting element
14 console
15 guiding element
16 console
16' rounded section
17 oblong hole
18 oblong hole
19 transverse bar
19' rounded outer edge
20 setting element
21 insert nut
22 sliding body
23 upper reversing area
24 electric motor
25 reducing gear
26 lower reversing area 27 handrail drive
28 electric motor
29 electric motor
30 electric motor
31 reducing gear
32 reducing gear
33 reducing gear
34 frequency converter
35 frequency converter
36 frequency converter
37 frequency converter
38 frequency converter
39 data line
40 data line
41 data line
42 data line
43 data line
44 control unit
A transport distance
a section
b section
c section
H altitude
L length
R radius

The invention claimed is:

1. A device for transporting passengers, the device comprising:
one of steps and a moving walkway equipped with pallets, the steps or pallets being connected to each other to form a continuous step or pallet belt, and being configured to be moved in a transport direction by drive elements, wherein
a lower entrance or exit section of the device is connected to an upper exit or entrance section via at least one arched transport section, the at least one arched transport section being formed by different radii which converge into each other, and
the at least one arched transport section includes a plurality of linear framing sections, the plurality of linear framing sections being connected to each other in a region of facing ends thereof.

2. The device according to claim 1, wherein the at least one arched transport section includes a plurality of curve arcs having a same or different curvatures.

3. The device according to claim 2, wherein the plurality of curve arcs are associated with linear or inclined sections of the at least one arched transport section.

4. The device according to claim 1, wherein the at least one arched transport section is a cantilever type transport section.

5. The device according to claim 1, wherein the plurality of linear framing sections are supported by an arched substructure at a side of a building.

6. The device according to claim 5, further comprising:
at least one bearing in a region of each of the plurality of linear framing sections, the at least one bearing being configured to enable adjustable positioning of at least one respective framing section with respect to the arched substructure.

7. The device according to claim 1, further comprising:
at least two consoles which face each other, the at least two consoles being configured to be adjusted with respect to each other, and the at least two consoles being associated with a setting element on a side of a respective linear framing section and on a side of a building.

8. The device according to claim 7, further comprising:
at least one transverse bar positioned in a region of each of the plurality of linear framing sections, the at least one transverse bar having rounded outer edges at least on a side of the at least two consoles, wherein
at least one of the at least two consoles has a rounded section and is configured to be guided over the rounded outer edges of the at least one transverse bar.

9. The device according to claim 8, wherein the respective setting element is a setting screw, the setting screw being configured to be adjusted within an insert nut positioned in the at least one transverse bar.

10. The device according to claim 9, wherein the setting screw has a sliding body in an end region thereof, the end region facing the arched substructure on the side of the building, and wherein the sliding body is on the arched substructure.

11. The device according to claim 7, wherein at least one of the at least two consoles has oblong holes configured to receive guiding elements of the at least one console.

12. The device according to claim 1, wherein a guiding element of the step or pallet belt is curve-shaped in a curve-shaped area of a transport path of the device.

13. A bearing for a framing section of an escalator or moving walkway for transporting passengers, the escalator or moving walkway being guided in a spatial curve arc, and being formed by a plurality of interconnected consoles, the plurality of interconnected consoles being adjustable with respect to each other, and being associated with at least one setting element.

14. The bearing according to claim 13, wherein at least one of the plurality of interconnected consoles has, oblong holes configured to receive guiding elements of the at least one of the plurality of interconnected consoles.

15. The bearing according to claim 14, wherein the oblong holes are on an arc of a circle in the at least one of the plurality of interconnected consoles.

16. The bearing according to claim 14, wherein the guiding elements are threaded bolts or screws, and the guiding elements are configured to be fixed in the oblong holes by nuts after adjustment of the plurality of interconnected consoles.

17. The bearing according to claim 13, wherein the at least one setting element is a setting screw.

18. The bearing according to claim 13, further comprising:
a sliding body at a free end of the at least one setting element.

19. The bearing according to claim 18, wherein at least one of the plurality of interconnected consoles is connected to a framing section and the sliding body is on a substructure at a side of a building.

* * * * *